US012562103B2

(12) United States Patent
Ryu et al.

(10) Patent No.: US 12,562,103 B2
(45) Date of Patent: Feb. 24, 2026

(54) DISPLAY APPARATUS AND DRIVING METHOD THEREOF

(71) Applicant: LG Display Co., Ltd., Seoul (KR)

(72) Inventors: Hoonsang Ryu, Paju-si (KR); YongHyeon Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/794,573

(22) Filed: Aug. 5, 2024

(65) Prior Publication Data

US 2025/0209967 A1 Jun. 26, 2025

(30) Foreign Application Priority Data

Dec. 26, 2023 (KR) ........................ 10-2023-0191366

(51) Int. Cl.
*G09G 3/32* (2016.01)
*G09G 3/3291* (2016.01)

(52) U.S. Cl.
CPC ............. *G09G 3/32* (2013.01); *G09G 3/3291* (2013.01); *G09G 2310/0275* (2013.01); *G09G 2320/0233* (2013.01)

(58) Field of Classification Search
CPC ...... G09G 3/32; G09G 3/3233; G09G 3/3291; G09G 2300/0426; G09G 2300/0819; G09G 2300/0852; G09G 2300/0861; G09G 2310/0275; G09G 2310/0286; G09G 2310/08; G09G 2320/0233; G09G 2320/0247; G09G 2340/0435; H10K 59/122; H10K 59/40; H10K 59/873; H10K 59/8792
USPC ........................................................... 345/55
See application file for complete search history.

(56) References Cited

U.S. PATENT DOCUMENTS

2008/0030435 A1* 2/2008 Kim ..................... G09G 3/3233 345/76
2017/0116918 A1* 4/2017 Dong ....................... G09G 3/20
2017/0329189 A1* 11/2017 Kim .................... G02F 1/13454
2018/0144685 A1* 5/2018 Gong ................. H10K 59/1213
2021/0201759 A1* 7/2021 Cho ...................... G09G 3/3233
2021/0201782 A1* 7/2021 Jang ...................... G09G 3/3233
2021/0376041 A1* 12/2021 Lee .................... H10K 59/1216
2022/0084472 A1* 3/2022 Kim ...................... G09G 3/3266
2022/0173189 A1* 6/2022 Kim ........................ G09G 3/325
2023/0086559 A1* 3/2023 Yuan .................... G09G 3/3233 345/55
2023/0115238 A1* 4/2023 Wang ..................... H10D 86/60 345/55

(Continued)

FOREIGN PATENT DOCUMENTS

KR 10-2012-0116547 A 10/2012
KR 10-2012-0132076 A 12/2012

*Primary Examiner* — Tom V Sheng
(74) *Attorney, Agent, or Firm* — Morgan, Lewis & Bockius LLP

(57) ABSTRACT

A display apparatus includes a first capacitor connected to a first node and a second node, and a second capacitor connected to the second node and first and second power control transistors. In addition, a driving method of a display apparatus includes, in a first period, connecting a second capacitor with an auxiliary voltage, and in a fifth period, blocking the second capacitor from the auxiliary voltage and connecting the second capacitor to a high potential power voltage.

12 Claims, 8 Drawing Sheets

(56) References Cited

U.S. PATENT DOCUMENTS

| | | | | |
|---|---|---|---|---|
| 2023/0137564 | A1* | 5/2023 | Lee | G09G 3/3208 345/76 |
| 2023/0237953 | A1* | 7/2023 | Tian | G09G 3/3233 345/55 |

* cited by examiner

DISPLAY APPARATUS AND DRIVING METHOD THEREOF

CROSS-REFERENCE TO RELATED APPLICATION

This application claims the benefit of Korean Patent Application No. 10-2023-0191366, filed on Dec. 26, 2023, which is hereby incorporated by reference as if fully set forth herein.

BACKGROUND

Field

The present disclosure relates to a display apparatus and a driving method thereof.

Description of the Related Art

With the advancement of the information age, the demand for a display apparatus for displaying an image has increased in various forms. Therefore, various types of display apparatuses such as a liquid crystal display (LCD) apparatus, a plasma display panel (PDP) apparatus and an organic light emitting display (OLED) apparatus have been recently used.

Among the display apparatuses, the organic light emitting display apparatus is a self-light emitting type and has advantages in that a viewing angle and a contrast ratio are more excellent than those of the liquid crystal display (LCD) apparatus. Also, since the organic light emitting display apparatus does not require a separate backlight, it is advantageous that the organic light emitting display apparatus is able to be thin and lightweight and has low power consumption. Further, the organic light emitting display apparatus has advantages in that it may be driven at a direct current low voltage, has a fast response speed and especially has a low manufacturing cost.

Recently, driving an organic light emitting display apparatus through a pulse width modulation (PWM) method has been disclosed to control luminance and improve low grayscale spots. In this case, a control signal for driving in a pulse width modulation (PWM) method may be supplied to a switching transistor disposed in a driving circuit of a pixel.

When the organic light emitting display apparatus is driven by the pulse width modulation (PWM) method, a copy Mura phenomenon may occur in a light emission area. In detail, the light emission area may be turned off for a short time by driving of the pulse width modulation (PWM) method. For example, when duty is 92%, the light emission area may emit light for a time period of 92% in one frame and may be periodically turned off several times for a time period of 8% in one frame. In this case, the light emission area may be sequentially turned off from one side to the other side. Accordingly, a driving current flowing in the light emission area may be sequentially reduced, and a high potential power voltage may be increased.

In this case, in an area of a display panel, which has entered a sampling period, as the high potential power voltage is increased, a gate-source voltage Vgs of a driving transistor may be changed. For example, when a capacitor is connected between the high potential power voltage and a source node of the driving transistor, a coupling phenomenon may occur between the high potential power voltage and the source node of the driving transistor. Accordingly, the gate-source voltage Vgs of the driving transistor may be changed, and luminance may be changed for each subpixel. As a result, luminance of the display panel may be non-uniform.

SUMMARY

The present disclosure has been made in view of the above problems, and it is an object of the present disclosure to provide a display apparatus and a driving method thereof, in which a luminance change is minimized.

In addition to the objects of the present disclosure as mentioned above, additional objects and features of the present disclosure will be clearly understood by those skilled in the art from the following description of the present disclosure.

In accordance with an aspect of the present disclosure, the above and other objects may be accomplished by the provision of a display apparatus comprising a plurality of pixels, each of the plurality of pixels including a light emitting element and a driving circuit for driving the light emitting element, wherein the driving circuit includes a driving transistor of which gate electrode is connected to a first node, a first electrode is connected to a first emission control transistor and a second electrode is connected to a second node, and a first capacitor of which first terminal is connected to the first node and a second terminal is connected to the second node, and a second capacitor of which first terminal is connected to the second node and a second terminal is connected to first and second power control transistors.

In accordance with another aspect of the present disclosure, the above and other objects may be accomplished by the provision of a driving method of a display apparatus comprising a display panel on which a plurality of pixels are disposed, wherein each of the plurality of pixels includes a first period for initializing a first capacitor and connecting a second capacitor with an auxiliary voltage, a second period for sensing a threshold voltage of a driving transistor, a third period for supplying a data voltage to a gate electrode of the driving transistor, a fourth period for initializing an anode electrode of a light emitting element, and a fifth period for blocking the second capacitor from the auxiliary voltage, connecting the second capacitor with a high potential power voltage and allowing the light emitting element to emit light.

Additional features and aspects of the present disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures.

BRIEF DESCRIPTION OF THE DRAWINGS

The accompanying drawings, which are included to provide a further understanding of the disclosure and are incorporated in and constitute a part of this application, illustrate example embodiments of the disclosure and together with the description serve to explain the principles of the disclosure. In the drawings.

DETAILED DESCRIPTION

Figure 1:
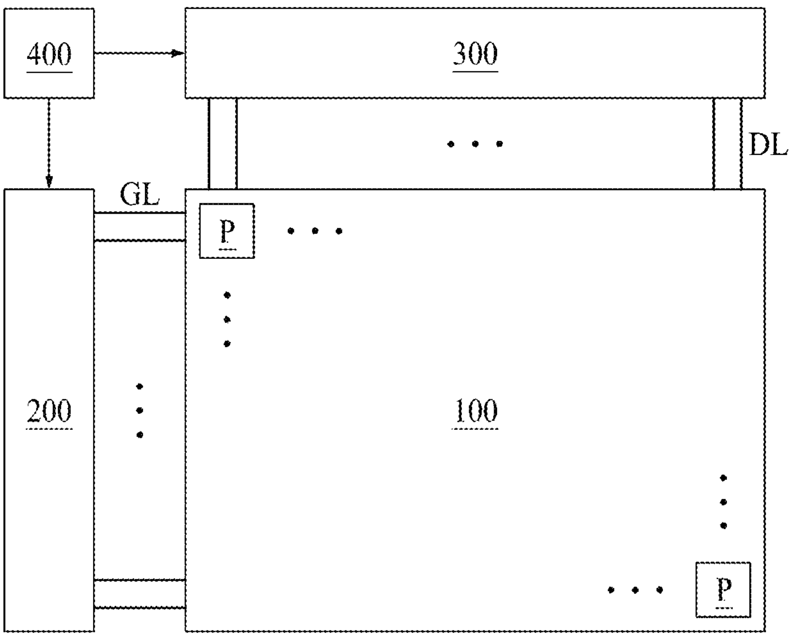
FIG. 1 is a block diagram illustrating a display apparatus according to an example embodiment of the present disclosure.

Advantages and features of the present disclosure and methods of achieving them will become apparent with reference to the example embodiments described below in detail in conjunction with the accompanying drawings. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art.

The shapes, dimensions, areas, lengths, thicknesses, ratios, angles, numbers, and the like, which are illustrated in the drawings to describe various example embodiments of the present disclosure, are merely given by way of example. Therefore, the present disclosure is not limited to such illustrated details in the drawings. Like reference numerals generally denote like elements throughout the specification, unless otherwise specified.

In the following description, where a detailed description of a relevant known function or configuration may unnecessarily obscure aspects of the present disclosure, a detailed description of such a known function or configuration may be omitted or be briefly discussed.

Where a term like "comprise," "have," or "include" is used, one or more other elements may be added unless the term is used with a more limiting term, such as "only" or the like. An element described in a singular form may include a plurality of elements, and vice versa, unless the context clearly indicates otherwise.

In construing an element, the element should be construed as including an error or tolerance range even where no explicit description of such an error or tolerance range is provided.

Where a positional relationship between two elements is described with such a term as "on," "above," "under," "next to," or the like, one or more other elements may be located between the two elements unless the term is used with a more limiting term, such as "immediate(ly)" or "direct(ly)."

Where a temporal relationship is described using such a term as "after," "subsequent(ly)," "next," "before," or the like, it may include a non-consecutive or non-continuous case unless it is used with a more limiting term like "immediately" or "directly."

Although terms "first," "second," and the like may be used herein to describe various elements, these elements should not be interpreted to be limited by these terms as they are not used to define a particular essence, order, sequence, precedence, or number of such elements. These terms are used only to refer one element separately from another. For example, a first element could be termed a second element, and a second element could similarly be termed a first element, without departing from the scope of the present disclosure.

Features of various embodiments of the present disclosure may be partially or wholly coupled to or combined with each other, and may be operated, linked, or driven together in various ways as those skilled in the art can sufficiently understand. The embodiments of the present disclosure may be carried out independently from each other, or may be carried out together in association with each other.

Hereinafter, example embodiments of the present disclosure will be described in detail with reference to the accompanying drawings.

FIG. 1 is a block diagram illustrating a display apparatus according to an example embodiment of the present disclosure.

As shown in FIG. 1, the display apparatus according to an example embodiment may include a display panel 100, a gate driver 200, a data driver 300, and a timing controller 400.

The display panel 100 may be a flat panel display panel or may be a flexible display panel. The display panel 100 may be formed of glass, plastic or plastic film, but is not limited thereto.

The display panel 100 may include a pixel array in which a plurality of pixels P are arranged in the form of a matrix. Each of the plurality of pixels P may include a plurality of subpixels, each of which includes a light emitting element. Each pixel may include subpixels of three or four colors or subpixels of two colors among a red subpixel for emitting red light, a green subpixel for emitting green light, a blue subpixel for emitting blue light and a white subpixel for emitting white light.

Each of the plurality of pixels P includes a light emitting element and a driving circuit for driving the light emitting element, and may be independently driven by the driving circuit.

Each of the plurality of pixels P may be connected to a plurality of signal lines including a gate line driven by the gate driver 200, a data line driven by the data driver 300, and a power line for supplying a power voltage.

The gate driver 200 may individually drive the gate lines GLs of the display panel 100 by receiving a plurality of gate control signals from the timing controller 400.

The data driver 300 may individually drive the data lines DL of the display panel 100 by receiving a plurality of data control signals from the timing controller 400.

The timing controller 400 may realign digital video data input from the outside and supply the realigned digital video data to the data driver 300. The timing controller 400 may control the operation timing of the gate driver 200 and the data driver 300 by using timing signals such as a vertical synchronization signal, a horizontal synchronization signal and a data enable signal, which are input from the outside.

Figure 2:
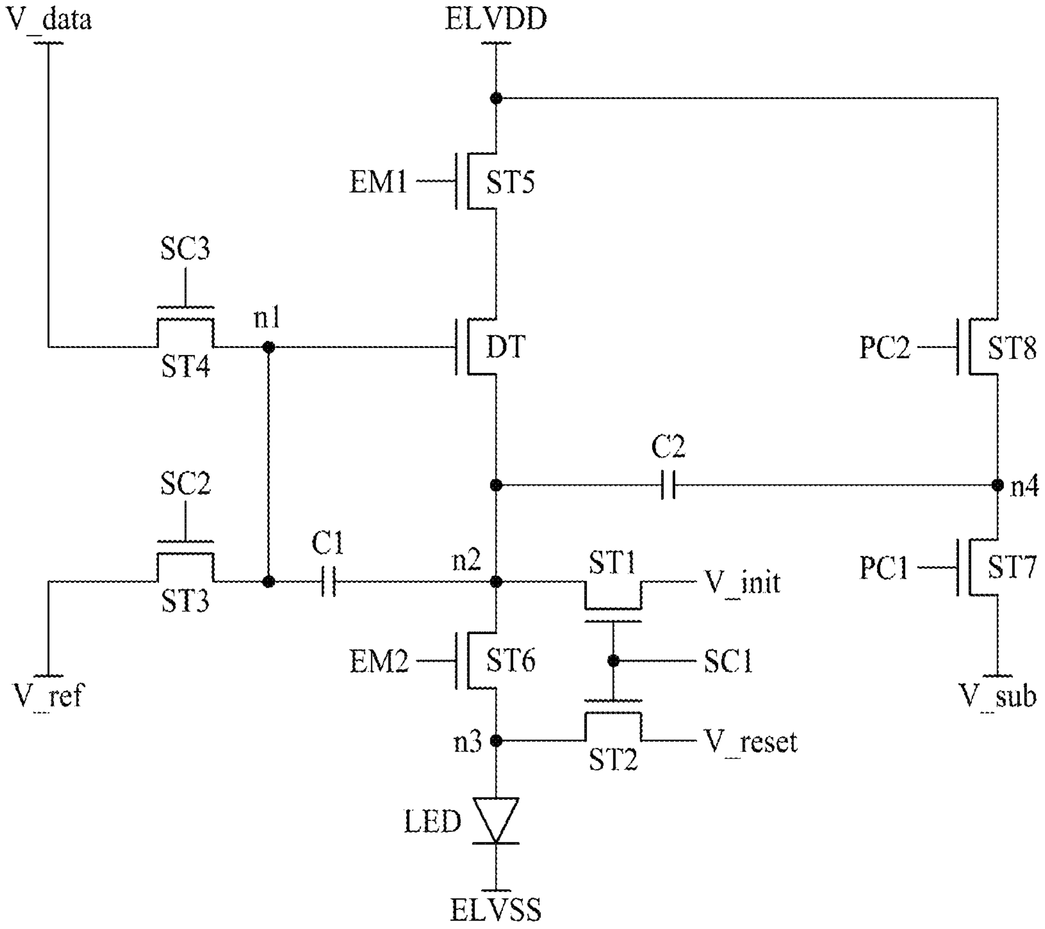
FIG. 2 is a circuit view illustrating one pixel according to an example embodiment of the present disclosure.

FIG. 2 is a circuit view illustrating one pixel P according to an example embodiment of the present disclosure.

One pixel P may include a light emitting element LED and a driving circuit for driving the light emitting element LED. The driving circuit may include a plurality of thin film transistors DT and ST1 to ST8 and first and second storage capacitors C1 and C2. The plurality of thin film transistors DT and ST1 to ST8 may include a driving transistor DT, and first to fourth switching transistors ST1 to ST4, first and second emission control transistors ST5 and ST6, and first and second power control transistors ST7 and ST8. In this case, each of the plurality of thin film transistors DT and ST1 to ST8 may be formed of an NMOS transistor.

A gate electrode of the driving transistor DT may be connected to a first node n1, a first electrode thereof may be connected to the first emission control transistor ST5, and a second electrode thereof may be connected to a second node n2. Also, the driving transistor DT may be electrically connected to a high potential power voltage ELVDD and a low potential power voltage ELVSS. The driving transistor DT may control a magnitude of a driving current I flowing to the light emitting element LED.

A gate electrode of the first switching transistor ST1 may be connected to a first scan signal SC1, a first electrode thereof may be connected to an initialization voltage V_init, and a second electrode thereof may be connected to the second node n2. That is, the second electrode of the first switching transistor ST1 may be connected to the same node as the second electrode of the driving transistor DT. The first switching transistor ST1 may operate in accordance with the first scan signal SC1. In addition, the first switching transistor ST1 may supply the initialization voltage V_init to the second node n2.

A gate electrode of the second switching transistor ST2 may be connected to the first scan signal SC1, a first electrode thereof may be connected to a reset voltage V_reset, and a second electrode thereof may be connected to a third node n3. The second switching transistor ST2 may operate in accordance with the first scan signal SC1. That is, since the second switching transistor ST2 and the first switching transistor ST1 are supplied with the same signal, these switching transistors may be simultaneously turned on or turned off. In addition, the second switching transistor ST2 may supply the reset voltage V_reset to the third node n3.

A gate electrode of the third switching transistor ST3 may be connected to a second scan signal SC2, a first electrode thereof may be connected to a reference voltage V_ref, and a second electrode thereof may be connected to the first node n1. That is, the second electrode of the third switching transistor ST3 may be connected to the same node as the gate electrode of the driving transistor DT. The third switching transistor ST3 may operate in accordance with the second scan signal SC2. In addition, the third switching transistor ST3 may supply the reference voltage V_ref to the first node n1.

A gate electrode of the fourth switching transistor ST4 may be connected to a third scan signal SC3, a first electrode thereof may be connected to a data voltage V_data, and a second electrode thereof may be connected to the first node n1. That is, the second electrode of the fourth switching transistor ST4 may be connected to the same node as the gate electrode of the driving transistor DT. The fourth switching transistor ST4 may operate in accordance with the third scan signal SC3. Also, the fourth switching transistor ST4 may supply the data voltage V_data to the first node n1.

A gate electrode of the first emission control transistor ST5 may be connected to a first emission control signal EM1, a first electrode thereof may be connected to the high potential power voltage ELVDD, and a second electrode thereof may be connected to the first electrode of the driving transistor DT. The first emission control transistor ST5 may operate in accordance with the first emission control signal EM1. Also, the first emission control transistor ST5 may supply the high potential power voltage ELVDD to the driving transistor DT.

The first emission control signal EM1 may be driven by a pulse width modulation (PWM) method. In detail, the pulse width modulation (PWM) method may be a modulation method for changing a width of a pulse in accordance with an amplitude of a signal. For example, when the amplitude of the signal is large, the width of the pulse may be increased, and when the amplitude of the signal is small, the width of the pulse may be reduced. As the first emission control signal EM1 is driven by the pulse width modulation (PWM) method, the first emission control transistor ST5 may be turned off for a short time. Therefore, the driving transistor DT may not receive the high potential power voltage ELVDD for a short time. As a result, driving of the driving transistor DT may be controlled, whereby luminance of the display apparatus may be adjusted.

A gate electrode of the second emission control transistor ST6 may be connected to a second emission control signal EM2, a first electrode thereof may be connected to the second node n2, and a second electrode thereof may be connected to the third node n3. That is, the first electrode of the second emission control transistor ST6 may be connected to the first switching transistor ST1 and the driving transistor DT, and the second electrode thereof may be connected to the second switching transistor ST2 and the light emitting element LED. The second emission control transistor ST6 may operate in accordance with the second emission control signal EM2. Also, the second emission control transistor ST6 may supply the driving current I applied from the driving transistor DT to the light emitting element LED.

A gate electrode of the first power control transistor ST7 may be connected to a first power control signal PC1, a first electrode thereof may be connected to a fourth node n4, and a second electrode thereof may be connected to an auxiliary voltage V_sub. The first power control transistor ST7 may operate in accordance with the first power control signal PC1. In detail, when the first power control signal PC1 in a high voltage state is supplied to the first power control transistor ST7, the auxiliary voltage V_sub connected to the second electrode of the first power control transistor ST7 may be supplied to the fourth node n4 connected to the first electrode of the first power control transistor ST7. In this case, since the fourth node n4 is connected to a terminal of a second capacitor C2, the auxiliary voltage V_sub may be supplied to the capacitor C2.

A gate electrode of the second power control transistor ST8 may be connected to a second power control signal PC2, a first electrode thereof may be connected to the high potential power voltage ELVDD, and a second electrode thereof may be connected to the fourth node n4. That is, the first electrode of the second power control transistor ST8 may be connected to the first emission control transistor ST5, and the second electrode thereof may be connected to the first power control transistor ST7. The second power control transistor ST8 may operate in accordance with a second power control signal PC2. In detail, when the second power control signal PC2 in a high voltage state is supplied to the second power control transistor ST8, the high potential power voltage ELVDD connected to the first electrode of the second power control transistor ST8 may be supplied to the fourth node n4 connected to the second electrode of the second power control transistor ST8. In this case, since the fourth node n4 is connected to the terminal of the second capacitor C2, the high potential power voltage ELVDD may be supplied to the second capacitor C2.

Meanwhile, a magnitude of the auxiliary voltage V_sub may be equal to that of the high potential power voltage ELVDD. When the first emission control signal EM1 is driven by the pulse width modulation (PWM) method, the driving current flowing to the driving transistor DT may be sequentially reduced, and the high potential power voltage ELVDD may be increased. In this case, to prevent the changed high potential power voltage ELVDD from being supplied to the second capacitor C2, connection between the second capacitor C2 and the high potential power voltage ELVDD may be blocked, and the second capacitor C2 and the auxiliary voltage V_sub may be connected to each other. In this case, for stable driving of the second capacitor C2, the magnitude of the auxiliary voltage V_sub may be set to be equal to that of the high potential power voltage ELVDD.

An anode electrode of the light emitting element LED may be connected to the third node N3, and a cathode electrode thereof may be connected to the low potential power voltage ELVSS. That is, the anode electrode of the light emitting element LED may be connected to the second switching transistor ST2 and the second emission control transistor ST6. The light emitting element LED may emit light in accordance with the driving current I.

A first terminal of a first capacitor C1 may be connected to the first node n1, and a second terminal thereof may be connected to the second node n2. That is, the first terminal of the first capacitor C1 may be connected to the gate electrode of the driving transistor DT, and the second terminal thereof may be connected to the second electrode of the driving transistor DT. The first capacitor C1 may store a voltage of the gate-second electrode of the driving transistor DT. Also, the first capacitor C1 may be referred to as a storage capacitor.

A first terminal of the second capacitor C2 may be connected to the second node n2, and a second terminal thereof may be connected to the fourth node n4. That is, the first terminal of the second capacitor C2 may be connected to the second electrode of the driving transistor DT, and the second terminal thereof may be connected to the first and second power control transistors ST7 and ST8. The second capacitor C2 may prevent a voltage change of the second node n2, that is, the second electrode of the driving transistor DT, from occurring.

Figure 3:
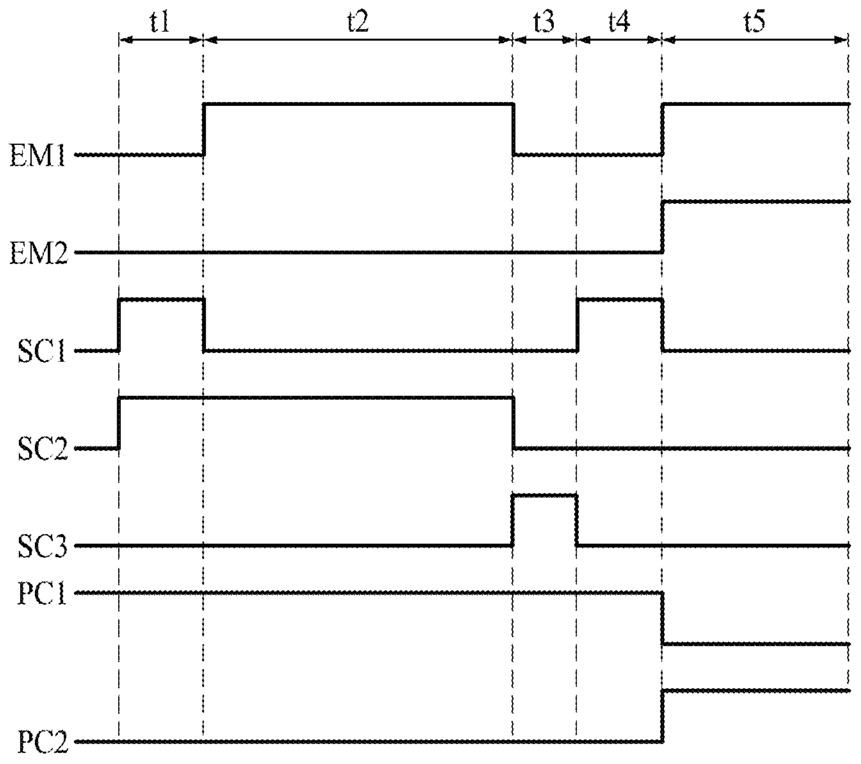
FIG. 3 is a view illustrating waveforms of a signal applied to a pixel according to an example embodiment of the present disclosure.

FIG. 3 is a view illustrating waveforms of a signal applied to a pixel according to an example embodiment of the present disclosure. The plurality of pixels P may be driven by being divided into first to fifth periods t1 to t5. The first to fifth periods t1 to t5 may be continuous without overlap. A driving process of the pixel P will be described in detail with reference to FIGS. 4 to 8.

Figure 4:
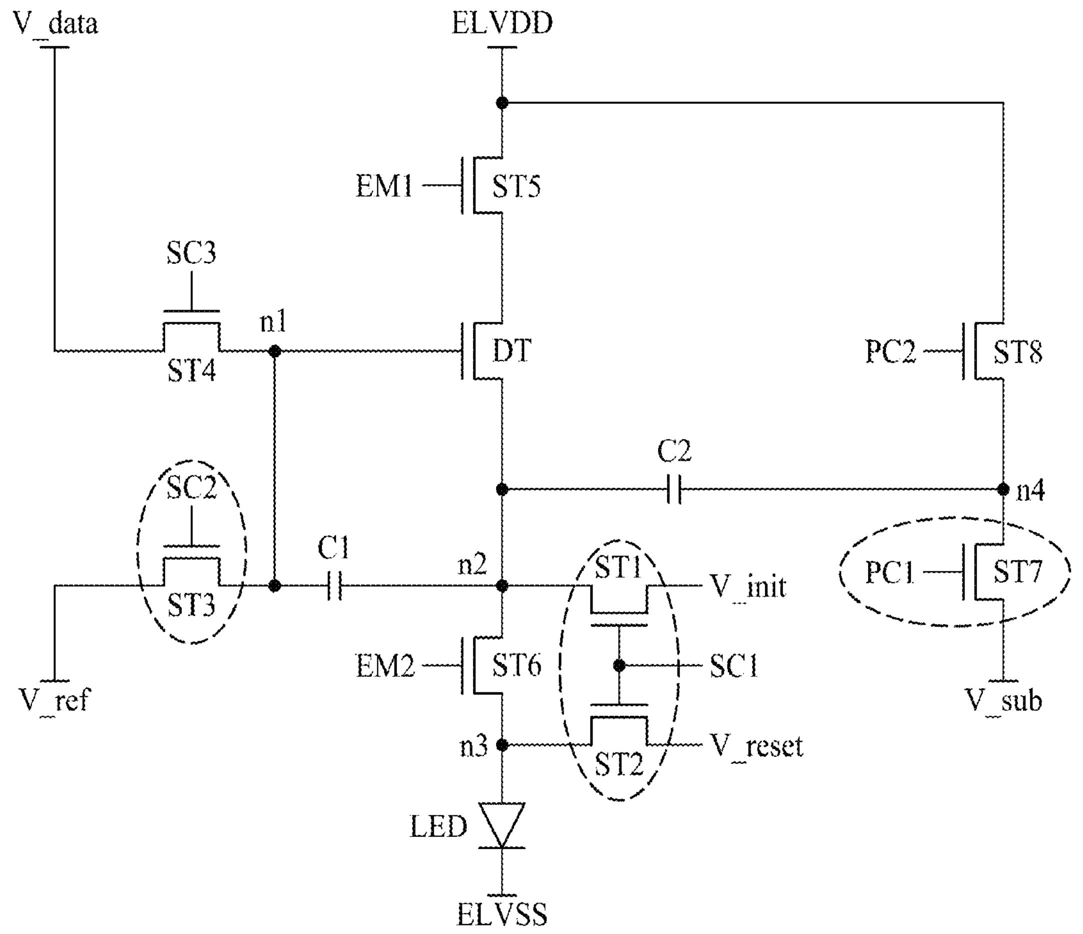
FIG. 4 is a circuit view illustrating driving of a first period of a pixel according to an example embodiment of the present disclosure.

FIG. 4 is a circuit view illustrating driving of a first period t1 of a pixel according to one embodiment of the present disclosure. The first period t1 may be an initial period.

At the first period t1, the first and second scan signals SC1 and SC2 in a high voltage state are applied, so that the first to third switching transistors ST1 to ST3 may be turned on. The initialization voltage V_init applied to the first switching transistor ST1 may be applied to the second node n2, and the reset voltage V_reset applied to the second switching transistor ST2 may be applied to the third node n3. Also, the reference voltage V_ref applied to the third switching transistor ST3 may be applied to the first node n1.

Since the first terminal of the first capacitor C1 is connected to the first node n1 and the second terminal is connected to the second node n2, each of the first and second terminals of the first capacitor C1 may be initialized to the reference voltage V_ref and the initialization voltage V_init. Therefore, the first capacitor C1 may be initialized to a voltage difference between the reference voltage V_ref and the initialization voltage V_init. Also, since the voltage difference between the reference voltage V_ref and the initialization voltage V_init is lower than a threshold voltage Vth of the driving transistor DT, the driving transistor DT may not be turned on.

Since the anode electrode of the light emitting element LED is connected to the third node n3, the anode electrode of the light emitting element LED may be initialized to the reset voltage V_reset. Also, since the reset voltage V_reset is lower than the low potential power voltage ELVSS, the light emitting element LED may not emit light.

In addition, the first power control signal PC1 in the high voltage state is applied, so that the first power control transistor ST7 may be turned on. Since the first terminal of the second capacitor C2 is connected to the second node n2 and the second terminal thereof is connected to the fourth node n4, each of the first and second terminals of the second capacitor C2 may be initialized to the initialization voltage V_init and the auxiliary voltage V_sub. Therefore, the second capacitor C2 may be initialized to a voltage difference between the initialization voltage V_init and the auxiliary voltage V_sub.

Figure 5:
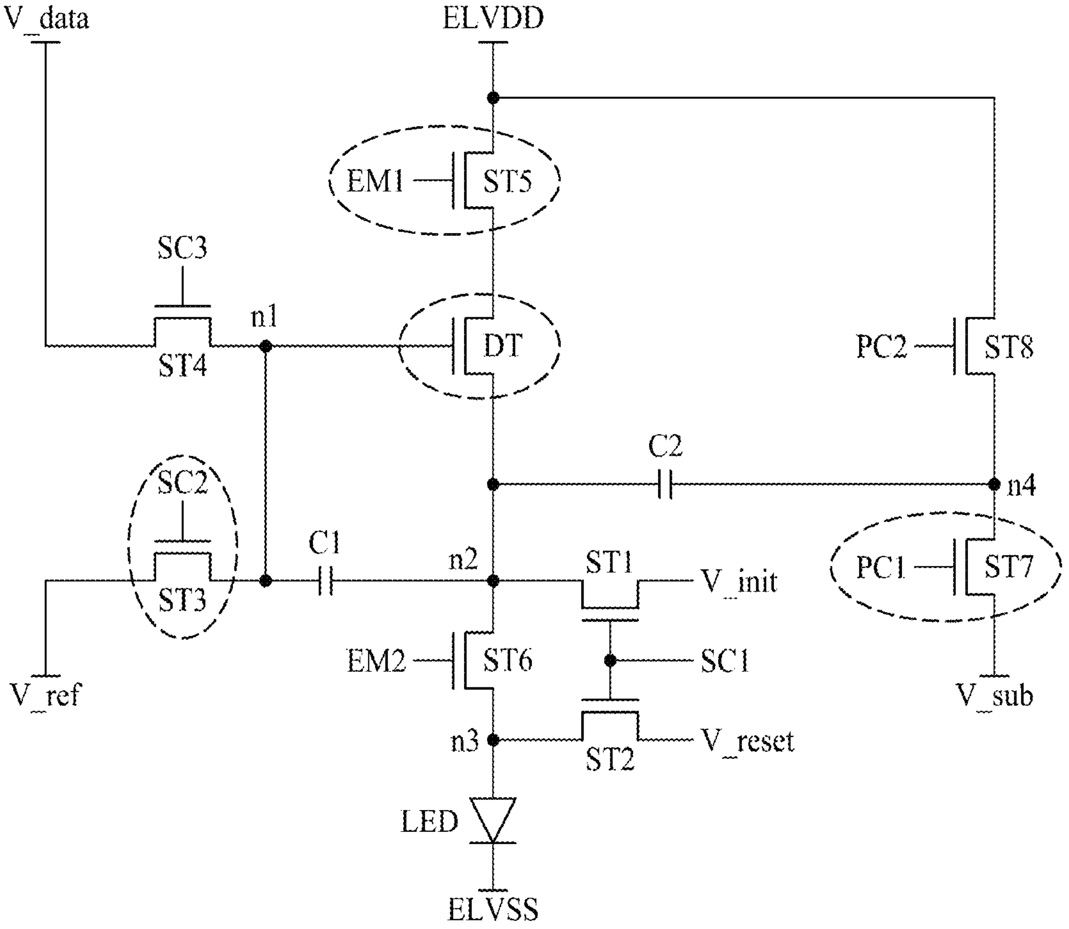
FIG. 5 is a circuit view illustrating driving of a second period of a pixel according to an example embodiment of the present disclosure.

FIG. 5 is a circuit view illustrating driving of a second period t2 of a pixel according to an example embodiment of the present disclosure. The second period t2 may be a sensing period.

At the second period t2, the second scan signal SC2 may be maintained in the high voltage state, and the first scan signal SC1 may be changed from the high voltage state to the low voltage state. Therefore, the third switching transistor ST3 may be maintained in the turn-on state, and the first and second switching transistors ST1 and ST2 may be changed from the turn-on state to the turn-off state. Also, the first emission control signal EM1 in the high voltage state is applied, so that the first emission control transistor ST5 may be in the turn-on state. In this case, the first emission control signal EM1 may be driven by the pulse width modulation (PWM) method.

Since the third switching transistor ST3 is in the turn-on state, the reference voltage V_ref may be supplied to the gate electrode of the driving transistor DT by the third switching transistor ST3. Also, since the first emission control transistor ST5 is in the turn-on state, the high potential power voltage ELVDD may be supplied to the first electrode of the driving transistor DT through the first emission control transistor ST5.

Therefore, since a voltage of the gate electrode of the driving transistor DT is maintained at the reference voltage V_ref and a voltage of a drain electrode thereof becomes the high potential power voltage ELVDD, the driving transistor DT may operate as a source follower.

By the source follower, the gate-source voltage Vgs of the driving transistor DT may be reduced until the threshold voltage Vth of the driving transistor DT. When the gate-source voltage Vgs of the driving transistor DT is reduced to reach the threshold voltage Vth of the driving transistor DT, the driving transistor DT may be turned off. Also, since the first capacitor C1 stores a voltage difference between the first and second terminals, the first capacitor C1 may store the threshold voltage Vth that is the gate-source voltage Vgs of the driving transistor DT. Also, a voltage of the second node n2 may be (Vref-Vth), which is a voltage difference between the reference voltage V_ref and the threshold voltage Vth of the driving transistor DT.

Meanwhile, the first emission control signal EM1 is driven by the pulse width modulation (PWM) method, and a voltage of a gate line for supplying the first emission control signal EM1 may be changed periodically. In this case, the light emission area may be sequentially turned off from one side to the other side. Therefore, the driving current flowing to the light emission area may be sequentially reduced, and the high potential power voltage ELVDD may be increased. Also, the capacitor connected to the changed high potential power voltage ELVDD may not be stably operated, or a voltage of a specific node may be changed.

For example, when there are no the first and second power control transistors ST7 and ST8, the first terminal of the second capacitor C2 may be connected to the second node n2, and the second terminal thereof may be directly connected to the high potential power voltage ELVDD. In this case, a coupling phenomenon occurs in the changed high potential power voltage ELVDD and the second node n2, whereby the voltage of the second node n2 may be changed. Therefore, the voltage of the second node n2 may be changed at the period for sensing the threshold voltage Vth, and an error may occur in the threshold voltage Vth sensed through the first capacitor C1. As a result, a Copy Mura phenomenon may occur, and luminance may be non-uniform.

In the present disclosure, the connection between the high potential power voltage ELVDD and the second capacitor C2 may be blocked through the first and second power control transistors ST7 and ST8 during the sensing period, which is the second period t2, whereby non-uniform luminance caused by the change of the high potential power voltage ELVDD may be avoided.

In detail, during the second period t2, the first power control signal PC1 may be in the high voltage state, and the second power control signal PC2 may be in the low voltage state. Therefore, the first power control transistor ST7 may be in the turn-on state, and the second power control transistor ST8 may be in the turn-off state. That is, the second capacitor C2 may be blocked from the high potential power voltage ELVDD, and may receive the auxiliary voltage V_sub. Therefore, a coupling phenomenon caused by the change of the high potential power voltage ELVDD may be prevented from occurring, whereby occurrence of a sensing error may be avoided. As a result, a Copy Mura phenomenon may be prevented from occurring, and change of luminance may be avoided.

In addition, the second capacitor C2 may be connected to the auxiliary voltage V_sub, so that the second capacitor C2 may be prevented from affecting sensing of the first capacitor C1, and may be prevented from being in a floating state.

Figure 6:
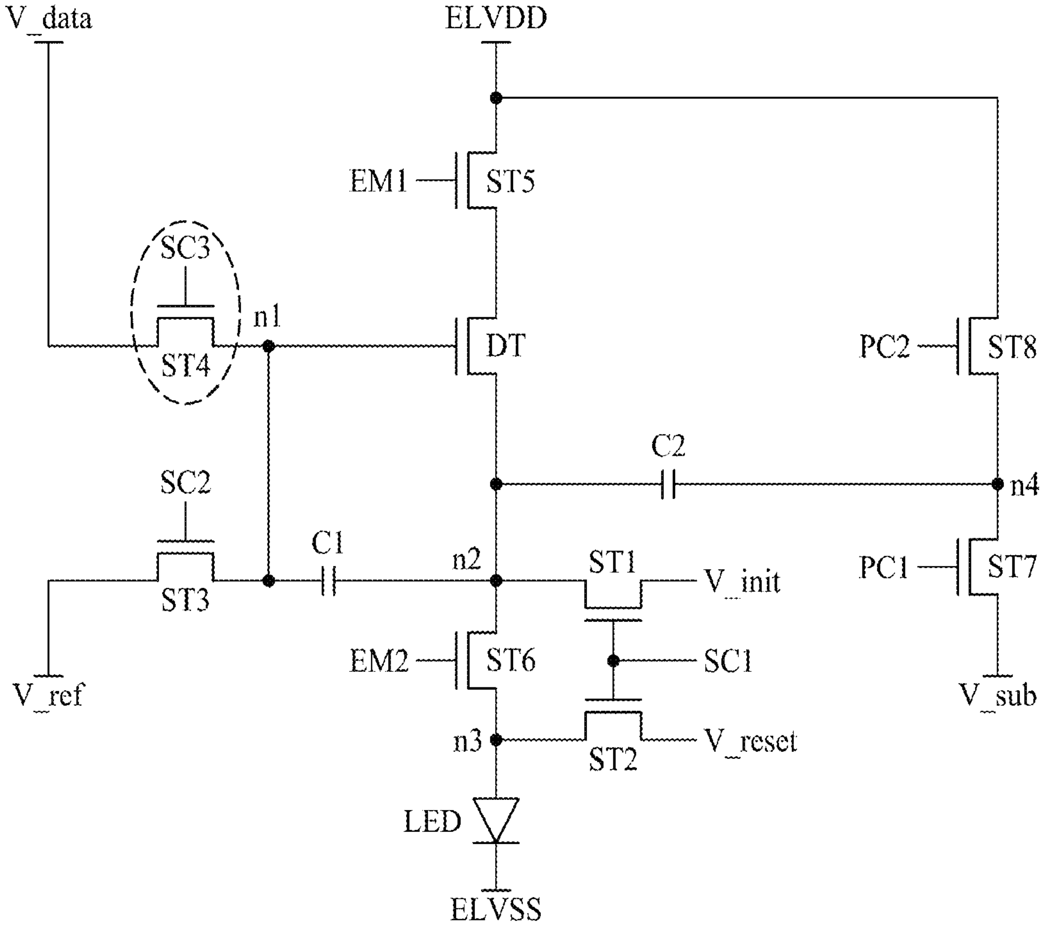
FIG. 6 is a circuit view illustrating driving of a third period of a pixel according to an example embodiment of the present disclosure.

FIG. 6 is a circuit view illustrating driving of a third period t3 of a pixel according to one embodiment of the present disclosure. The third period t3 may be a write period.

At the third period t3, the first emission control signal EM1 and the second scan signal SC2 may be changed from the high voltage state to the low voltage state. Therefore, the first emission control transistor ST5 and the third switching transistor ST3 may be changed from the turn-on state to the turn-off state. Also, the third scan signal SC3 may be changed from the low voltage state to the high voltage state. Therefore, the fourth switching transistor ST4 may be changed from the turn-off state to the turn-on state.

Since the fourth switching transistor ST4 is in the turn-on state, the data voltage V_data may be supplied to the first node n1 by the fourth switching transistor ST4. Since the gate electrode of the driving transistor DT is connected to the first node n1, the gate electrode of the driving transistor DT may be changed from the reference voltage V_ref to the data voltage V_data.

In this case, since the first and second capacitors C1 and C2 are electrically connected in series, a coupling phenomenon may occur. That is, as the voltage of the first node n1 is changed from the reference voltage V_ref to the data voltage V_data, the voltage of the second node n2 may be changed due to the coupling phenomenon. That is, a voltage of a source electrode, which is the second electrode of the driving transistor DT, may be changed.

The voltage of the source electrode of the driving transistor DT may be changed in accordance with the amount of change in the voltage of the gate electrode of the driving transistor DT. In detail, since the gate electrode of the driving transistor DT is changed from the reference voltage V_ref to the data voltage V_data, the amount of change in the voltage of the first node n1 may be (V_data−V_ref). In this case, the voltage of the source electrode of the driving transistor DT may be changed from (Vref−Vth) to (Vref−Vth)+C'(Vdata−Vref), wherein C'=(C1/(C1+C2+C_LED)), and C_LED may be capacitance of the light emitting element LED.

That is, the second capacitor C2 connected in series with the first capacitor C1 may be formed, so that a capacitance ratio of the first capacitor C1 may be relatively reduced, and thus luminance of the light emitting element LED, which is relative to the data voltage V_data applied to the first node n1, may be improved.

Figure 7:
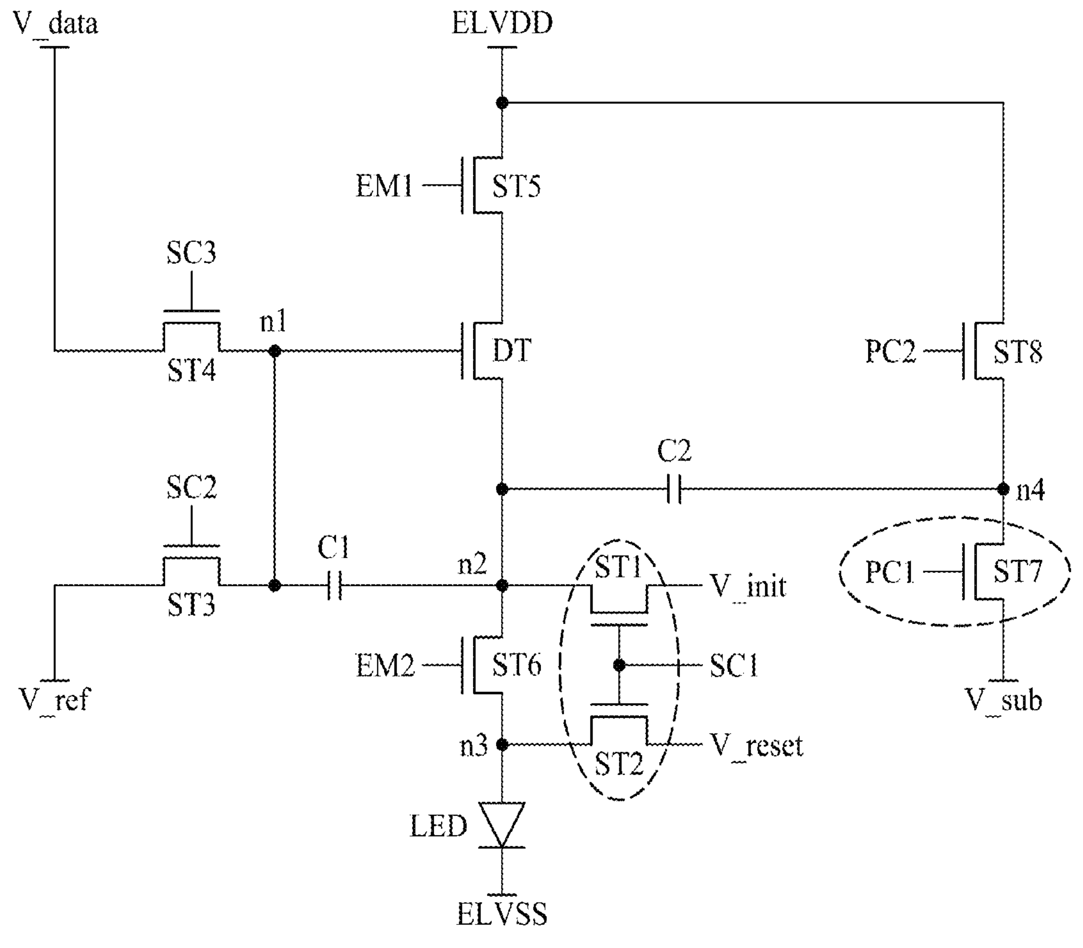
FIG. 7 is a circuit view illustrating driving of a fourth period of a pixel according to an example embodiment of the present disclosure.

FIG. 7 is a circuit view illustrating driving of a fourth period t4 of a pixel according to an example embodiment of the present disclosure. The fourth period t4 may be an on-bias stress (OBS) period.

At the fourth period t4, the third scan signal SC3 may be changed from the high voltage state to the low voltage state. Therefore, the fourth switching transistor ST4 may be changed from the turn-on state to the turn-off state. In addition, the first scan signal SC1 may be changed from the low voltage state to the high voltage state. Therefore, the first and second switching transistors ST1 and ST2 may be changed from the turn-off state to the turn-on state.

Since the first and second switching transistors ST1 and ST2 are in the turn-on state, the initialization voltage V_init applied to the first switching transistor ST1 may be applied to the second node n2, and the reset voltage V_reset applied to the second switching transistor ST2 may be applied to the third node n3. Therefore, the second node n2 may be initialized to the initialization voltage V_init again.

Figure 8:
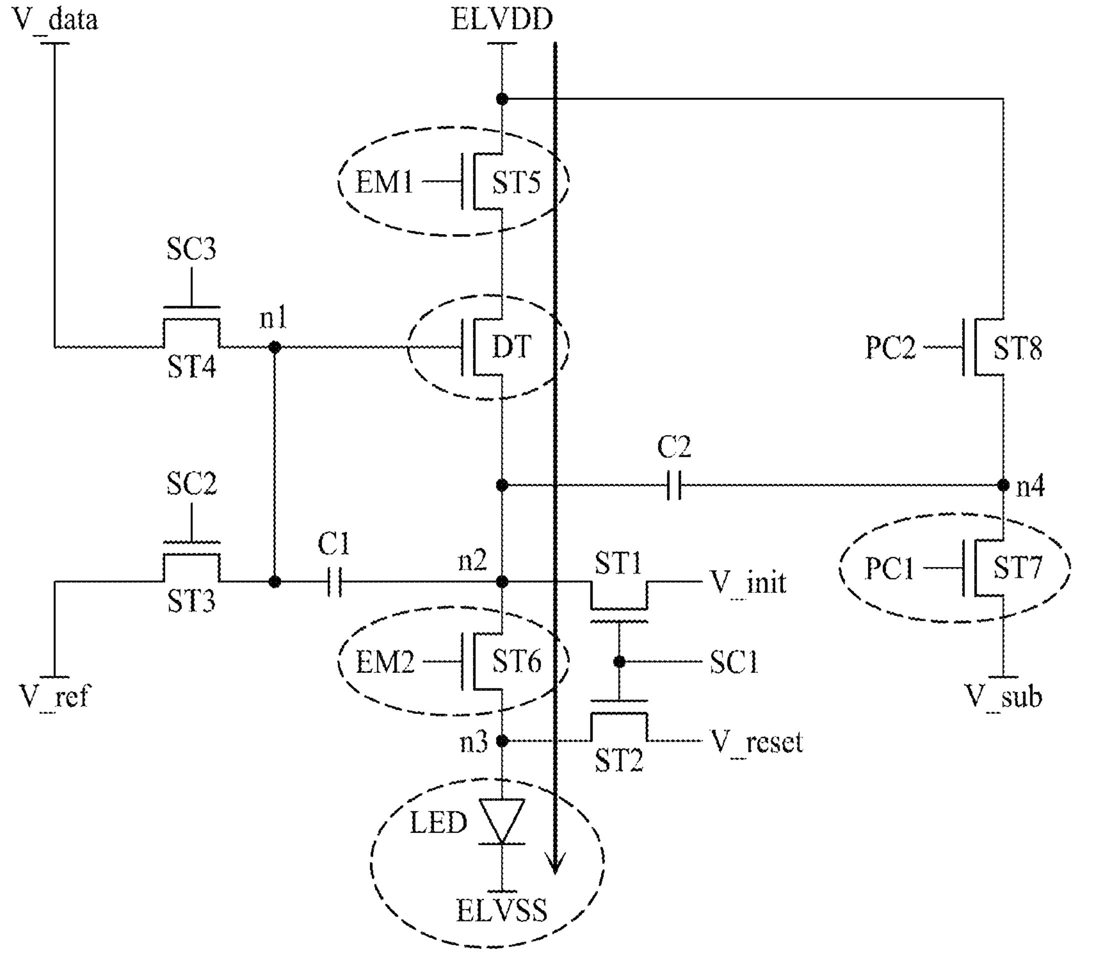
FIG. 8 is a circuit view illustrating driving of a fifth period of a pixel according to an example embodiment of the present disclosure.

FIG. 8 is a circuit view illustrating driving of a fifth period t5 of a pixel according to an example embodiment of the present disclosure. The fifth period t5 may be an emission period.

At the fifth period t5, the first power control signal PC1 and the first scan signal SC1 may be changed from the high voltage state to the low voltage state. Therefore, the first power control transistor ST7 and the first and second switching transistors ST1 and ST2 may be changed from the turn-on state to the turn-off state. Also, the first and second emission control signals EM1 and EM2 and the second power control signal PC2 may be changed from the low voltage state to the high voltage state. Therefore, the first and second emission control transistors ST5 and ST6 and the second power control transistor ST8 may be changed from the turn-off state to the turn-on state.

Since the first to fourth switching transistors ST1 to ST4 are in the turn-off state, the driving current I of the driving transistor DT may flow to the light emitting element LED. Therefore, the light emitting element LED may emit light.

Also, since the first power control transistor ST7 is in the turn-off state and the second power control transistor ST8 is in the turn-on state, the second capacitor C2 may be connected between the high potential power voltage ELVDD and the second node n2. Since the magnitude of the high potential power voltage ELVDD is equal to the magnitude of the auxiliary voltage V_sub, the first capacitor C1 connected to the second capacitor C2 at the second node n2 may be stably discharged. Therefore, the light emitting element LED may stably emit light.

According to the present disclosure, the following advantageous effects may be obtained.

According to the present disclosure, the capacitor and the high potential power voltage may be connected to or blocked from each other, whereby the luminance change of the display apparatus may be minimized.

It will be apparent to those skilled in the art that the present disclosure is not limited by the above-described example embodiments and the accompanying drawings, and that various substitutions, modifications, and variations can be made in the present disclosure without departing from the spirit or scope of the disclosures. Therefore, the above example embodiments of the present disclosure are provided for illustrative purposes and are not intended to limit the scope or technical concept of the present disclosure. The protective scope of the present disclosure should be construed based on the following claims and their equivalents, and it is intended that the present disclosure cover all modifications and variations of this disclosure that come within the scope of the claims and their equivalents.

What is claimed is:

1. A display apparatus comprising:

a plurality of pixels, each of the plurality of pixels including a light emitting element and a driving circuit configured to drive the light emitting element, wherein the driving circuit includes:

a driving transistor including a gate electrode connected to a first node, a first electrode connected to a first emission control transistor, and a second electrode connected to a second node;

a first capacitor including a first terminal connected to the first node and a second terminal connected to the second node; and a second capacitor including a first terminal connected to the second node and a second terminal connected to first and second power control transistors, wherein a gate electrode of the first power control transistor is connected to a first power control signal, a first electrode of the first power control transistor is connected to the second capacitor, and a second electrode of the first power control transistor is connected to an auxiliary power voltage, and wherein a gate electrode of the second power control transistor is connected to a second power control signal, a first electrode of the second power control transistor is connected to a high potential power voltage, and a second electrode of the second power control transistor is connected to the second capacitor.

2. The display apparatus of claim 1, wherein a magnitude of the auxiliary power voltage is equal to a magnitude of the high potential power voltage.

3. The display apparatus of claim 1, wherein a gate electrode of the first emission control transistor is connected to a first emission control signal, a first electrode of the first emission control transistor is connected to the high potential power voltage, and a second electrode of the first emission control transistor is connected to the driving transistor.

4. The display apparatus of claim 3, wherein the first emission control signal is driven by a pulse width modulation (PWM) operation.

5. The display apparatus of claim 1, wherein the driving circuit further includes a second emission control transistor including a gate electrode connected to a second emission control signal, a first electrode connected to the second node, and a second electrode connected to an anode of the light emitting element.

6. The display apparatus of claim 5, wherein the driving circuit further includes:

a first switching transistor configured to apply an initialization voltage to the second node; and a second switching transistor configured to apply a reset voltage to the anode of the light emitting element.

7. A driving method of a display apparatus comprising a display panel including a plurality of pixels, each of the plurality of pixels including a light emitting element, a driving transistor, a first capacitor, and a second capacitor, the driving method comprising:

in a first period, initializing the first capacitor and connecting the second capacitor with an auxiliary voltage;

in a second period, sensing a threshold voltage of the driving transistor;

in a third period, supplying a data voltage to a gate electrode of the driving transistor;

in a fourth period, initializing an anode of the light emitting element; and in a fifth period, blocking the second capacitor from the auxiliary voltage, connecting the second capacitor with a high potential power voltage, and allowing the light emitting element to emit light.

8. The driving method of claim 7, further comprising, in the first period:

turning on a first power control transistor, which includes a first electrode connected to the second capacitor and a second electrode connected to the auxiliary electrode, to supply the auxiliary voltage to the second capacitor.

9. The driving method of claim 7, further comprising, in the fifth period:

turning on a second power control transistor, which includes a first electrode connected to the high potential power voltage and a second electrode connected to the second capacitor, to supply the high potential power voltage to the second capacitor.

10. The driving method of claim 7, wherein a magnitude of the auxiliary voltage is equal to a magnitude of the high potential power voltage.

11. The driving method of claim 7, further comprising, in the second period:

turning on a first emission control transistor, which includes a first electrode connected to the high potential power voltage and a second electrode connected to a first electrode of the driving transistor.

12. The driving method of claim 11, further comprising, in the second period:

driving the first emission control transistor by a pulse width modulation (PWM) method.

* * * * *